US012764562B2

(12) United States Patent
Bai et al.

(10) Patent No.: US 12,764,562 B2
(45) Date of Patent: Oct. 13, 2026

(54) ANTENNA PANEL CONFIGURATION AFTER REPORTING

(71) Applicant: QUALCOMM Incorporated, San Diego, CA (US)

(72) Inventors: Tianyang Bai, Mountain View, CA (US); Yan Zhou, San Diego, CA (US); Peter Gaal, San Diego, CA (US); Mostafa Khoshnevisan, San Diego, CA (US); Junyi Li, Greentown, PA (US); Tao Luo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 89 days.

(21) Appl. No.: 18/919,221

(22) Filed: Oct. 17, 2024

(65) Prior Publication Data

US 2025/0039687 A1 Jan. 30, 2025

Related U.S. Application Data

(63) Continuation of application No. 17/935,457, filed on Sep. 26, 2022, now Pat. No. 12,127,012.

(60) Provisional application No. 63/276,452, filed on Nov. 5, 2021.

(51) Int. Cl.

| | |
|---|---|
| ***H04W 16/28*** | (2009.01) |
| ***H04L 1/1812*** | (2023.01) |
| ***H04W 8/24*** | (2009.01) |

(52) U.S. Cl.

CPC ........... *H04W 16/28* (2013.01); *H04L 1/1812* (2013.01); *H04W 8/24* (2013.01)

(58) Field of Classification Search

CPC ..................................................... H04W 16/28

USPC .......................................................... 375/267

See application file for complete search history.

(56) References Cited

U.S. PATENT DOCUMENTS

| | | | | |
|---|---|---|---|---|
| 2003/0001725 | A1* | 1/2003 | Moore | G06K 17/00 340/10.3 |
| 2009/0100093 | A1* | 4/2009 | Makipaa | G06F 16/739 |
| 2019/0313407 | A1* | 10/2019 | Tsai | H04W 72/0446 |
| 2020/0029274 | A1 | 1/2020 | Cheng et al. | |
| 2020/0267537 | A1 | 8/2020 | Oak et al. | |
| 2020/0267712 | A1 | 8/2020 | Cirik et al. | |

(Continued)

OTHER PUBLICATIONS

International Search Report and Written Opinion—PCT/US2022/077317—ISA/EPO—Mar. 1, 2023.

(Continued)

*Primary Examiner* — Lihong Yu

(74) *Attorney, Agent, or Firm* — Patterson + Sheridan, L.L.P/ Qualcomm

(57) ABSTRACT

Certain aspects of the present disclosure provide techniques for configuring a user equipment (UE) to communicate with a network entity based on a selected antenna panel reported to a network entity. An example method generally includes transmitting, to a network entity, a report including information associated with an antenna panel selected for communications between the user equipment and the network entity; selecting a starting time and a wait time to apply a configuration associated with the selected antenna panel; activating an update timer based on the starting time and the wait time; and communicating with the network entity based on the configuration associated with the selected antenna panel after expiry of the update timer.

29 Claims, 7 Drawing Sheets

(56) References Cited

U.S. PATENT DOCUMENTS

| | | | | |
|---|---|---|---|---|
| 2021/0050666 | A1 | 2/2021 | Cirik et al. | |
| 2022/0217746 | A1* | 7/2022 | Kang | H04B 7/0404 |
| 2023/0145731 | A1 | 5/2023 | Bai et al. | |
| 2023/0155655 | A1* | 5/2023 | Zhang | H04B 7/0691<br>375/262 |

OTHER PUBLICATIONS

Partial International Search Report—PCT/US2022/077317—ISA/EPO—Jan. 2, 2023.

* cited by examiner

ANTENNA PANEL CONFIGURATION AFTER REPORTING

CROSS-REFERENCE TO RELATED APPLICATIONS

This application is a continuation of U.S. Non Provisional patent application Ser. No. 17/935,457, filed Sep. 26, 2022, which claims benefit of U.S. Provisional Patent Application Ser. No. 63/276,452, filed Nov. 5, 2021, and assigned to the assignee hereof, the contents of which are hereby incorporated by reference in their entirety.

INTRODUCTION

Aspects of the present disclosure relate to wireless communications, and more particularly, to techniques for applying panel configuration information for communications between a user equipment (UE) and network entity after transmission of a report to the network entity.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communication by a wireless communication device. An example method generally includes transmitting, to a network entity, a report including information associated with an antenna panel selected for communications between the user equipment and the network entity; selecting a starting time and a wait time to apply a configuration associated with the selected antenna panel; activating an update timer based on the starting time and the wait time; and communicating with the network entity based on the configuration associated with the selected antenna panel after expiry of the update timer.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

DETAILED DESCRIPTION

Aspects of the present disclosure provide apparatuses, methods, processing systems, and computer-readable mediums for autonomously applying an antenna panel configuration at a user equipment (UE) based on reporting configuration information to a network entity.

In wireless communications systems, UEs can initiate antenna panel activation and selection for communications between the UE and a network entity having one or more antenna panels. Generally, each antenna panel may be associated with information reported by the UE, such as a channel state information (CSI) reference signal (RS) identifier or a synchronization signal block (SSB) index. At some later point in time, the network entity can communicate with the UE using one or more antenna panels, based on the information reported by the UE (and potentially other information that can be used to select the antenna panel).

Explicit indication by the network entity of the antenna panel(s) to be used for communications with the UE and other configuration information for communications with the UE may impose a processing overhead on communications between the network entity and the user equipment. Further, in some environments, signaling carrying information about the antenna panel(s) to be used for communications with the UE and other configuration information may be lost, which may impose a further processing overhead in retransmission of such signaling and may cause communications between the UE and network entity to fail.

Aspects of the present disclosure provide techniques for configuring UEs to communicate with a network entity based on update timers associated with the transmission of a report including information associated with a selected antenna panel from the UE to the network entity. The update timer may be activated, for example, when a report is transmitted from the UE to the network entity, or when an acknowledgment of the report is received by the UE, and the UE need not wait for receipt of an explicit indication of antenna panels to activate or deactivate in order to allow the UE to communicate with a network entity using antenna panels without the latency involved in explicit indication of the antenna panel(s) to be used and other configuration information for such communications.

Introduction to Wireless Communication Networks

Figure 1:
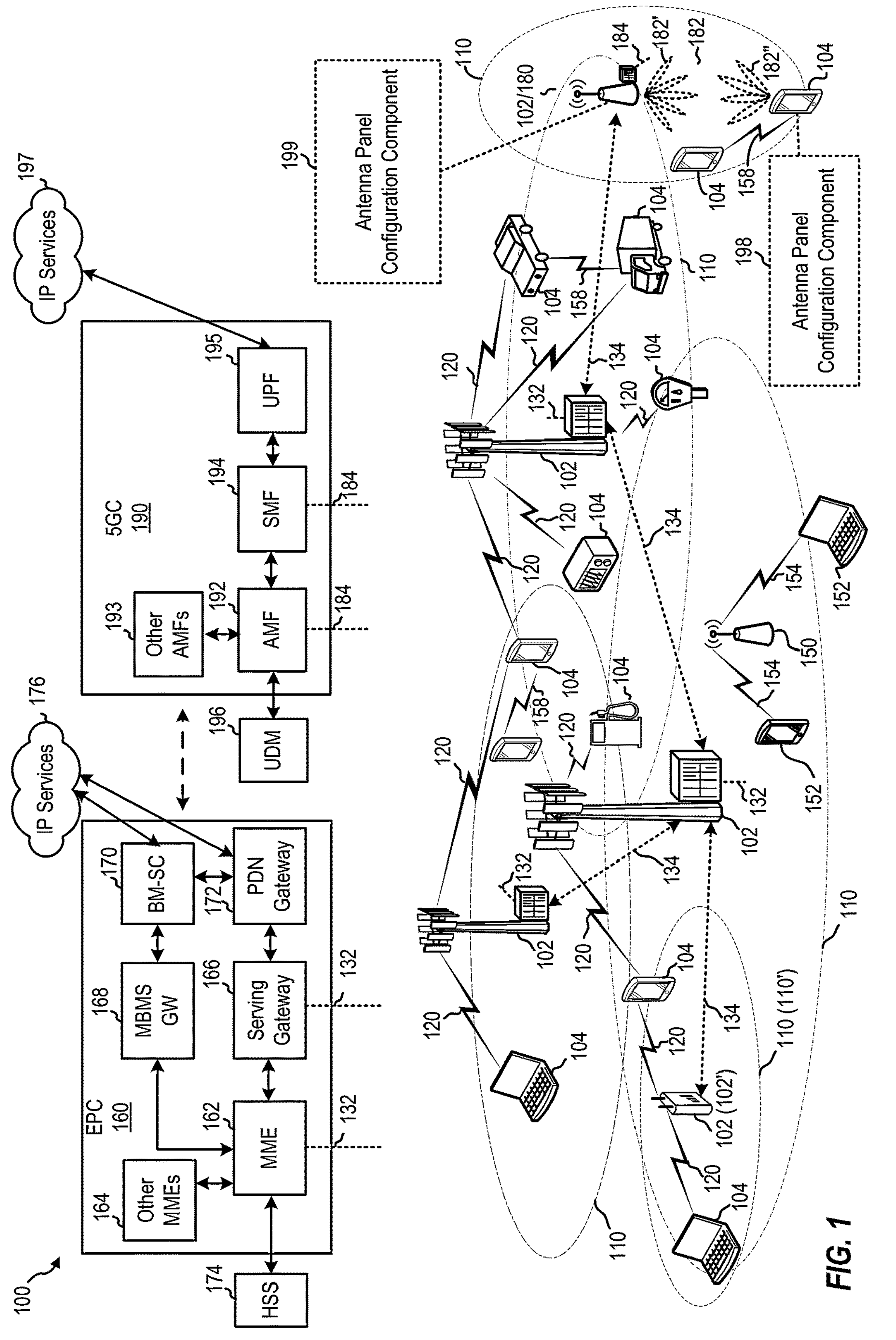
FIG. 1 is a block diagram conceptually illustrating an example wireless communication network.

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Wireless communication network 100 includes antenna panel configuration component 199, which may be configured to select an antenna panel for communications with the UE. Wireless network 100 further includes antenna panel configuration component 198, which may be configured to configure the UE to communicate with a network entity using a configuration associated with a selected antenna panel.

Figure 2:
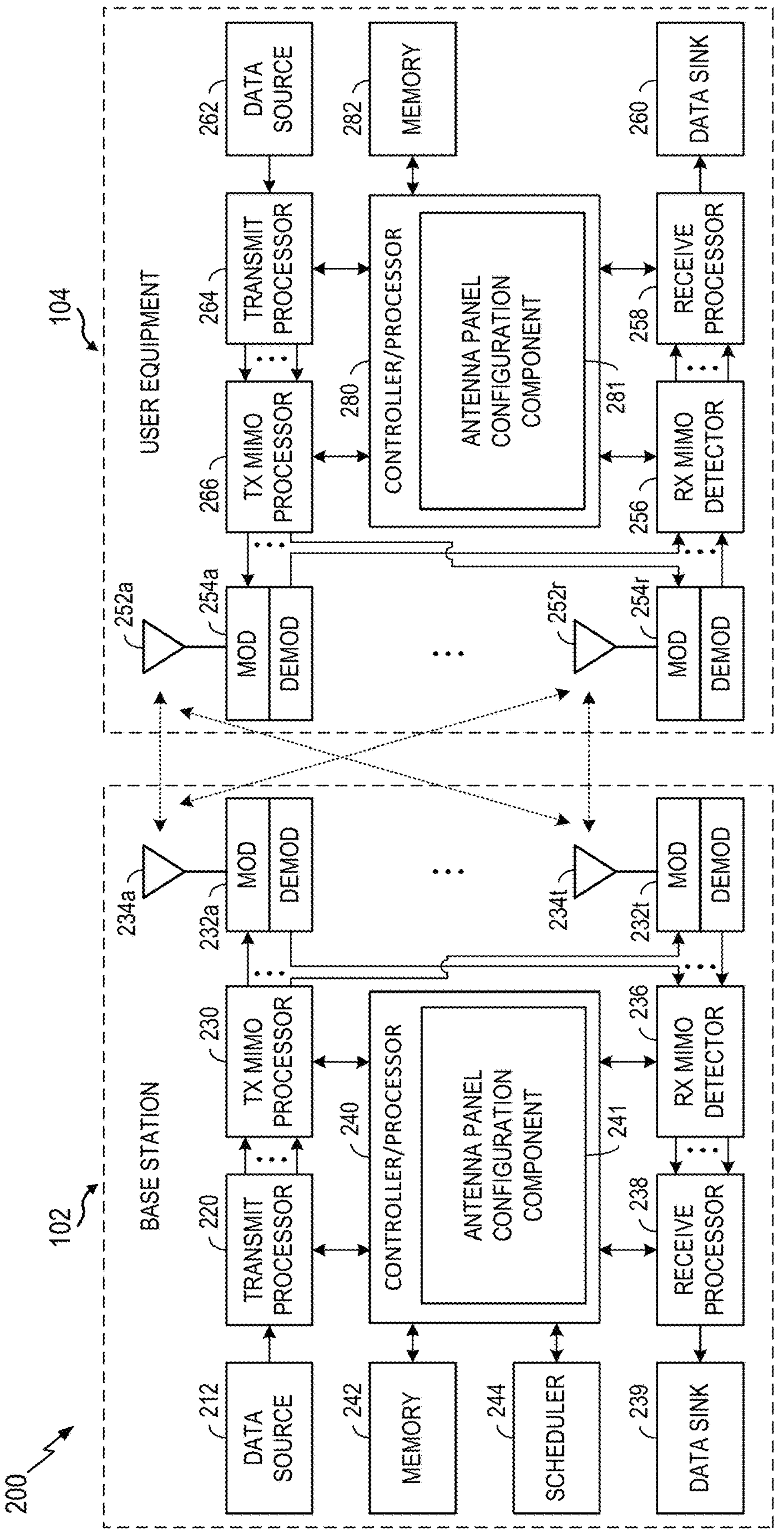
FIG. 2 is a block diagram conceptually illustrating aspects of an example a base station and user equipment.

FIG. 2 depicts aspects of an example base station (BS) 102 and a user equipment (UE) 104.

Generally, base station 102 includes various processors (e.g., 220, 230, 238, and 240), antennas 234*a-t* (collectively 234), transceivers 232*a-t* (collectively 232), which include modulators and demodulators, and other aspects, which enable wireless transmission of data (e.g., source data 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes antenna panel configuration component 241, which may be representative of antenna panel configuration component 199 of FIG. 1. Notably, while depicted as an aspect of controller/processor 240, antenna panel configuration component 241 may be implemented additionally or alternatively in various other aspects of base station 102 in other implementations.

Generally, user equipment 104 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., source data 262) and wireless reception of data (e.g., data sink 260).

User equipment 102 includes controller/processor 280, which may be configured to implement various functions related to wireless communications. In the depicted example, controller/processor 280 includes antenna panel configuration component 281, which may be representative of antenna panel configuration component 198 of FIG. 1. Notably, while depicted as an aspect of controller/processor 280, antenna panel configuration component 281 may be implemented additionally or alternatively in various other aspects of user equipment 104 in other implementations.

Figure 3B:
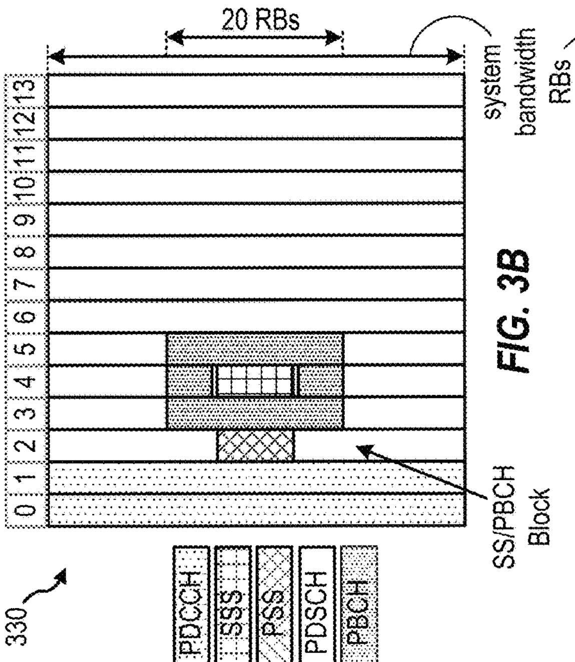
FIGS. 3A-3D depict various example aspects of data structures for a wireless communication network.
Figure 3A:
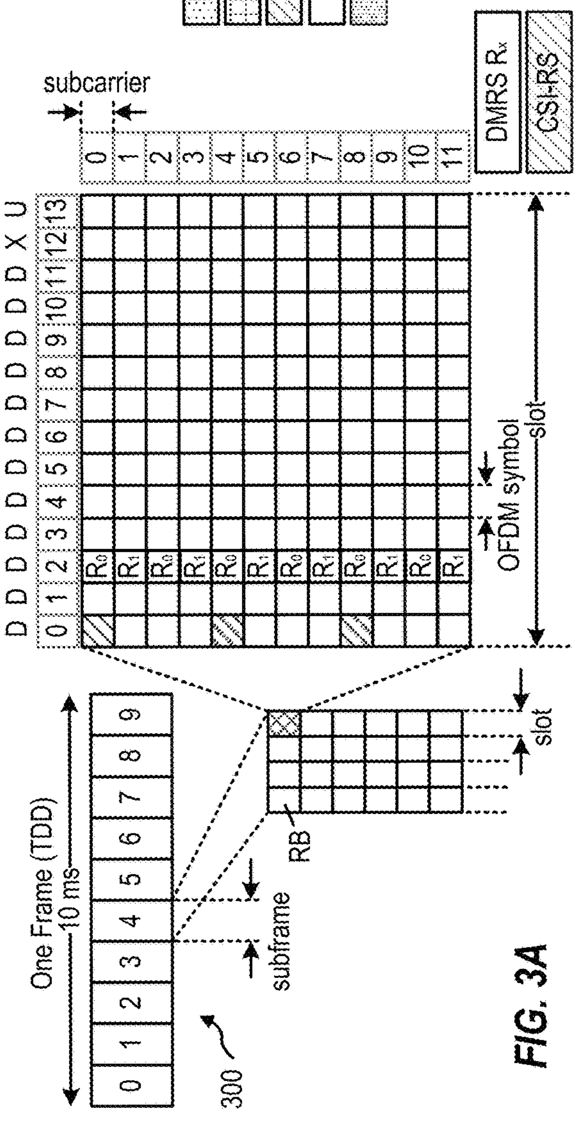
Figure 3D:
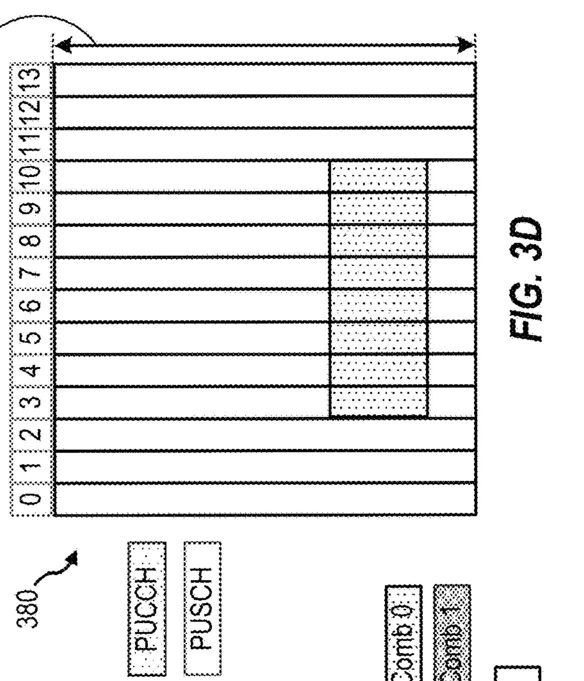
Figure 3C:
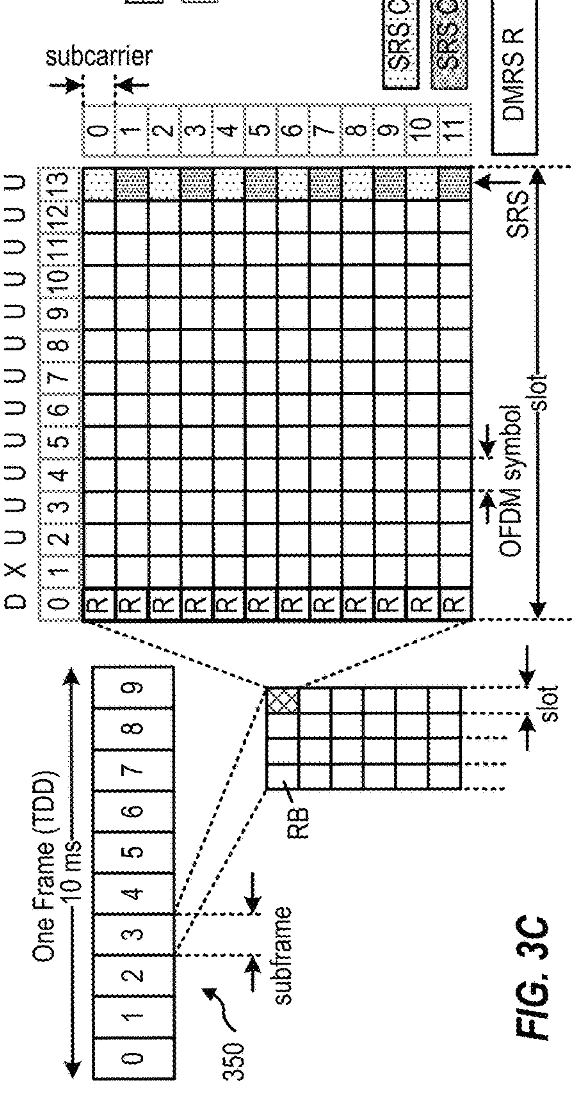

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Aspects Related to Antenna Configuration After Reporting

In wireless communications systems, a UE may be allowed to initiate antenna panel activation and selection. In one scheme, antenna panel entities may correspond to or otherwise be associated with a CSI-RS or an SSB resource index reported to a network entity. These associations between CSI-RSs and/or SSB resource indices may be determined by the UE. The UE may support reporting a maximum number of SRS ports and a coherence type for each of a plurality of antenna panels in UE capability reporting to the network entity and may support multiple codebook-based SRS resource sets with different maximum numbers of SRS ports. An indicated SRS resource index may be based on SRS resources corresponding to one SRS resource set, and the SRS resource set may be aligned with UE capabilities for the antenna panel (or an antenna panel entity).

In another scheme, the UE may report, to a network entity, one or more of a list of supported uplink ranks (or number of uplink transmission layers), a list of a supported number of SRS antenna ports, or a list of coherence types indicating a subset of antenna ports for each coherence type. A network entity may configure associations between rank indices and uplink ranks, numbers of SRS antenna ports, or coherence types. A UE may include at least one of the maximum uplink rank, the number of SRS antenna ports, or a coherence type corresponding to a reported SSB resource index or CSI-RS resource indicator in a beam report transmitted to the network entity, which may indicate a selected antenna panel for use in communications with the network entity.

In both of these schemes, a UE may apply configuration information for communications with a network entity autonomously. Aspects of the present disclosure provide techniques for a UE to determine when to apply this configuration information for communications with a network entity. By allowing the UE to autonomously determine when to apply this configuration information for communications with a network entity, aspects of the present disclosure may allow a UE to apply this configuration information without waiting for explicit signaling from the network entity of the configuration parameters to be used in communications with the network entity. This may result in reduced latency in applying this configuration information and may improve the performance and reliability of communications between the UE and the network entity, as the UE may switch beams and antenna panels used in communications without waiting for explicit indications which may not be successfully received or may include outdated information that is not applicable, or at least not optimized, for a current state of the UE.

Generally, a UE may apply a configuration based on a report of antenna panel information transmitted to the network entity. In one example, the antenna panel information may include an association between an antenna panel (e.g., a logical index associated with an antenna panel) and a CSI-RS or SSB resource index. Based on a beam report, the beam corresponding to the CSI-RS and/or SSB may be associated with a reported antenna panel identifier, and the UE may communicate (i.e., transmit to and receive from) any channel or reference signal associated with the beam using the antenna panel associated with the reported antenna panel identifier. In another example, the panel information may include an association between reported metrics with a CSI-RS resource index or SSB index and an associated antenna panel or transmission configuration indicator (TCI) state. The UE may apply a reported metric for an antenna panel and/or TCI associated with a reported CSI-RS or SSB resource index after some amount of time. The metrics may trigger reconfiguration (e.g., of a number of layers for uplink transmission) or activation of one or more antenna panels (e.g., when an indication of a new antenna panel is included in the report), and the network entity may schedule uplink traffic corresponding to the CSI-RS and/or SSB based on the reported metrics.

Figure 4:
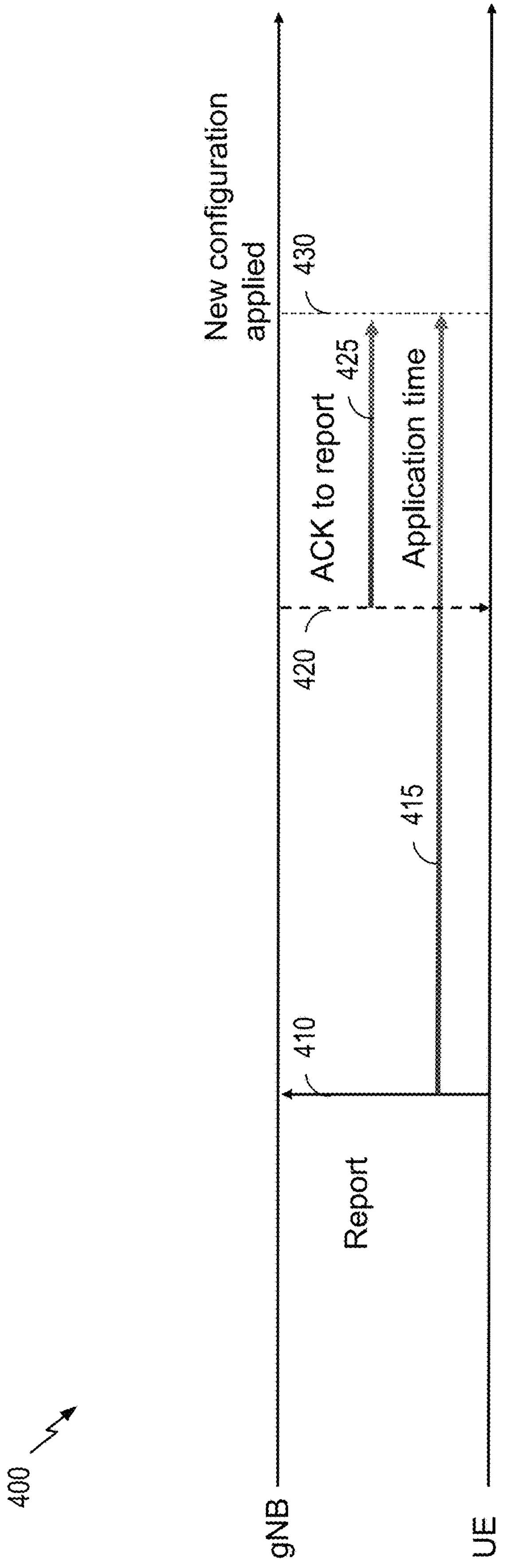
FIG. 4 illustrates an example timeline for applying an antenna panel configuration at a user equipment (UE) based on reporting configuration information to a network entity, in accordance with certain aspects of the present disclosure.

FIG. 4 illustrates an example timeline 400 for applying an antenna panel configuration at a user equipment (UE) based on receiving a beam indication from a network entity, in accordance with certain aspects of the present disclosure.

As illustrated, timeline 400 may begin with transmission of a report 410 from a UE to a network entity. As discussed, the report 410 may include information associated with an antenna panel selected for communications between the UE and the network entity, such as a TCI state associated with a selected antenna panel, information associated with a resource index (e.g., a CSI-RS resource index or an SSB resource index), or the like.

In one case, an update timer may be activated upon transmission of report 410 from the UE to the network entity. The timer may have a duration 415 from transmission of report 410 from the UE to the network entity. Upon expiry of the update timer, the UE may apply a configuration at time 430 associated with the selected antenna panel indicated in report 410.

The report 410 may be a periodic report, a semi-persistent report, or an aperiodic report. For periodic and semi-persistent reports, a UE may not be aware of whether the network entity has successfully received the report 410 without receiving an acknowledgment of the report. For aperiodic reports, the UE can assume that the network entity has received the report 410 if the UE does not receive a further request for a report or retransmission of the report. Because a UE can assume successful receipt of the report 410 when report 410 is an aperiodic report, the UE can reset and update the update timer based on the transmission of the report 410 and receipt of further signaling from the network entity. For example, the expiry time of an update timer can be updated by the UE when the UE receives an indication to retransmit the report or a trigger to report the same configuration (e.g., in downlink control information (DCI)). After expiry of the update timer, the UE may apply the configuration information associated with the information carried in report 410 (e.g., information associated with an antenna panel selected for communications between the UE and the network entity). If the UE receives new configuration information from the network entity, the UE can cancel the update timer and start an explicit update application timer in response to receiving the new configuration information.

In another case, such as when report is a periodic or semi-persistent report, receipt of an acknowledgment message 420 responsive to report 410 may be used as the starting time to activate an update timer with a duration 425. Generally, an acknowledgment message 420 indicates that a periodic or semi-persistent report has been received by the network entity, while non-receipt of an acknowledgment message 420 may not be sufficient to indicate whether the network entity has actually received a periodic or semi-persistent report. After the update timer has expired, the UE may apply a configuration at time 430 associated with the selected antenna panel indicated in report 410. By waiting for an acknowledgment message, the UE may ensure that the report 410 is received at the network entity prior to applying the configuration associated with the selected antenna panel and ensure that the network entity has not rejected the selection of the antenna panel included in the report and indicated to the UE that some other configuration is to be used (e.g., to reduce interference caused to other users in the wireless communications network).

In some aspects, a report may be transmitted on the physical uplink shared channel (PUSCH) with the uplink shared channel (UL-SCH). An uplink grant scheduling a new transmission with a same hybrid automatic repeat request (HARQ) identifier may be treated as an acknowledgment 420 of report 410.

Acknowledgment messages, such as acknowledgment message 420, may be used to acknowledge periodic or semi-persistent reporting carried on the physical uplink control channel (PUCCH) or aperiodic or semi-persistent reporting carried on the PUSCH with or without the UL-SCH. In some aspects, acknowledgment message 420 may be a dedicated acknowledgment, for example, included in a reserved index in a downlink control information (DCI) field. The reserved index may, for example, include an index of the selected antenna panel.

In some aspects, the acknowledgment message 420 may be a configuration command transmitted by the network entity (e.g., in DCI or a medium access control (MAC) control element (CE) (MAC-CE)). In this case, the configuration command may include an indication of an association between a CSI-RS, an SSB, and/or a TCI state identifier with an antenna panel. The network entity may transmit a configuration command with information that matches information included in the report 410, which the UE may treat as an acknowledgment of the report. In some aspects, the network entity can transmit a configuration command with information that is different from the information included in the report 410. In some aspects, the duration 425 of the update timer may differ based on whether the network entity has accepted or rejected the configuration associated with the selected antenna panel in the report 410.

In some aspects, the acknowledgment message 420 may include a command to deactivate an antenna panel. For example, a message specifying a panel to be deactivated may serve as acknowledgment message 420. In such a case, the UE may apply a configuration associated with the selected panel for communications between the network entity and the UE after expiry of the update timer. However, the configuration may not be applied to the panel indicated as deactivated in the acknowledgment message 420.

A report 410 transmitted to the network entity may include multiple associations between state identifiers (e.g., TCI state IDs) and antenna panels. The resulting acknowledgment message may include an indicator that all of the associations between state identifiers and antenna panels have been accepted by the network entity (e.g., through a reserved index in the acknowledgment message). Where a subset of the associations are accepted, the network entity can transmit a configuration command including information identifying one or more associations. In one case, the identified associations in the configuration command may be those applied for communications between the UE and the network entity. In another case, state identifier-antenna panel associations not identified in the configuration command may be considered accepted by the network entity. The associations explicitly identified in the configuration command may be considered as rejected associations.

Figure 5:
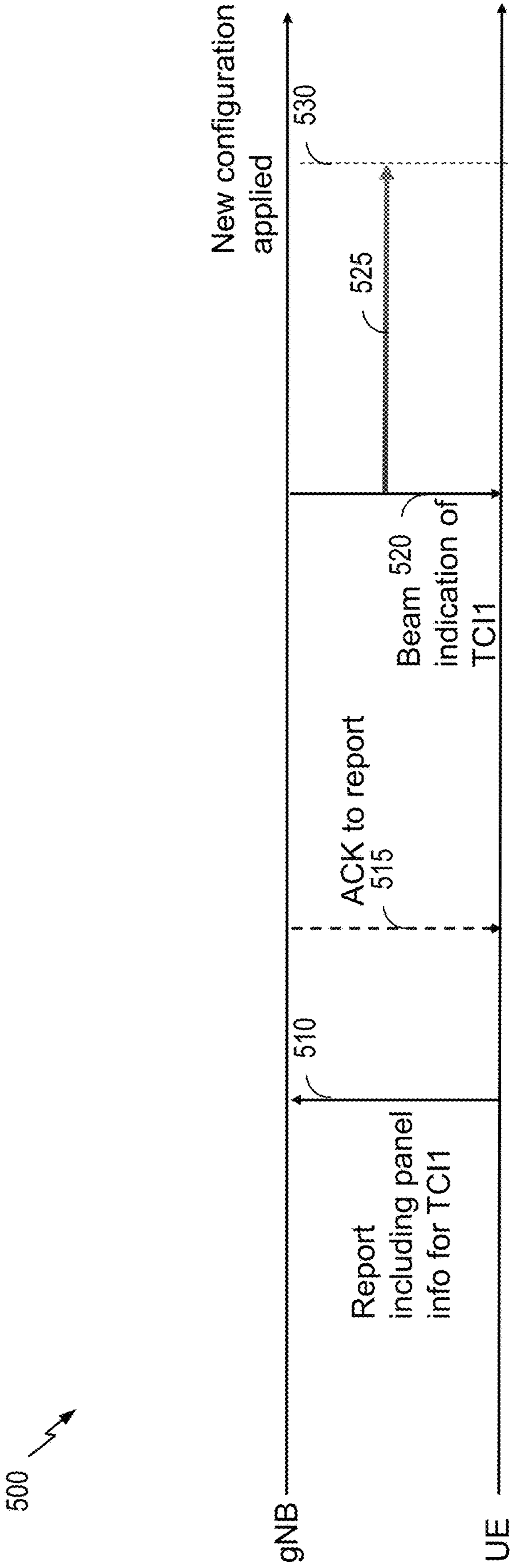
FIG. 5 illustrates an example timeline for applying an antenna panel configuration at a user equipment (UE) based on receiving a beam indication from a network entity, in accordance with certain aspects of the present disclosure.

FIG. 5 illustrates an example timeline 500 for applying an antenna panel configuration at a user equipment (UE) based on receiving a beam indication from a network entity, in accordance with certain aspects of the present disclosure. In this example, the UE may transmit a report 510 including a transmission control indicator (TCI) state and panel information for the indicated TCI state. The network entity may, but need not, acknowledge receipt of report 510 through acknowledgment message 515. Regardless of whether the network entity transmits acknowledgment message 515, the UE may not activate an update timer for applying a configuration associated with the selected antenna panel until a beam indication message 520 including the indicated TCI state is received. After receiving beam indication message 520 including the indicated TCI state is received, the UE can activate an update timer with duration 525, and at time 530, the configuration associated with the selected antenna panel and the indicated TCI state may be applied and used for communications between the UE and the network entity. Generally, duration 525 may differ based on whether an antenna panel is to be activated. For example, duration 525 may be longer when an antenna panel is to be activated than when a TCI is to be activated or applied on an already activated antenna panel.

Figure 6:
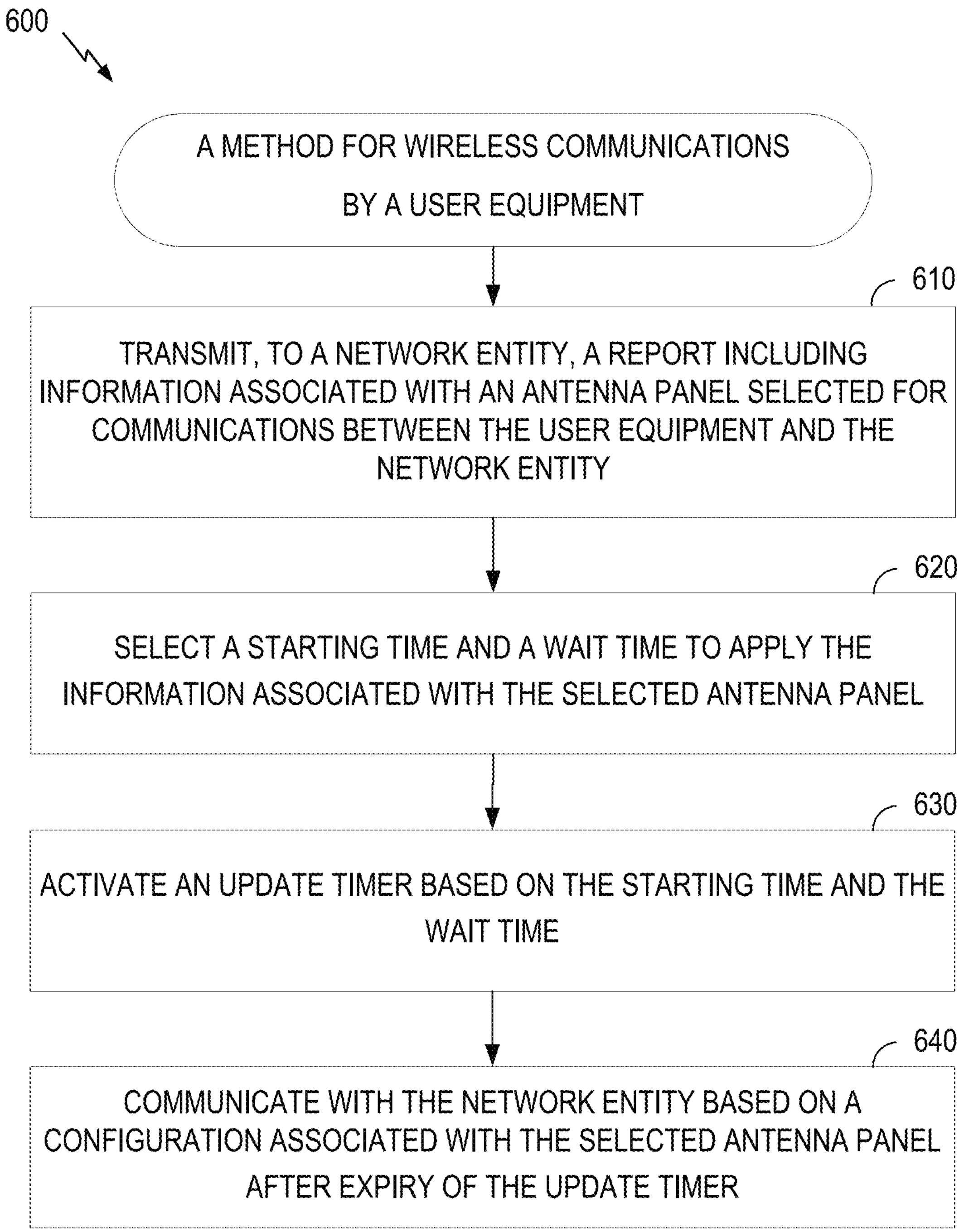
FIG. 6 illustrates example operations for wireless communication by a user equipment (UE) to communicate with a network entity based on parameters associated with a reported antenna panel, in accordance with certain aspects of the present disclosure.

FIG. 6 illustrates example operations 600 that may be performed to configure to communicate with a network entity based on parameters associated with a reported antenna panel. Operations 400 may be performed, for example, by antenna panel configuration component 198 of FIG. 1 (e.g., where a UE configures itself with the set of machine learning models)

As illustrated, operations 600 may begin at block 610, where a report including information associated with an antenna panel selected for communications between the user equipment and the network entity is transmitted to the network entity. As discussed, the report may include a transmission control indicator (TCI) state associated with the selected antenna panel, a resource index associated with the selected antenna panel, or the like. The resource index may be, for example, a CSI-RS resource index, an SSB resource index, or other resource index that can be associated with a specific antenna panel for use in communications between the UE and the network entity. The report may be associated, for example, with a beam reporting instance or a beam failure request message transmitted to the network entity.

At block 620, a starting time and a wait time to apply a configuration associated with the selected antenna panel is selected. The starting time and the wait time may be based, for example, on whether an acknowledgment message is expected to be received from the network entity. For example, the starting time may be a time at which the report is transmitted if no acknowledgment message is expected to be received and may be a time at which the acknowledgment message is received if an acknowledgment message is expected to be received from the network entity. In another example, the network entity may explicitly indicate the starting time to the UE. The starting time may be based, for example, on information carried in a UE capability report transmitted to the network entity.

At block 630, an update timer is activated based on the starting time and the wait time. For example, if the starting time is defined as the time at which the report is transmitted (e.g., at block 610) to the network entity, the update timer may be activated when the report is transmitted. If the starting time is defined as the time at which an acknowledgment message for the report is received from the network entity, the UE can wait to activate the update timer until receiving an acknowledgment message for the report transmitted at block 610.

At block 640, communications are performed with the network entity based on the configuration associated with the selected antenna panel after expiry of the update timer. Generally, by waiting until expiry of the update timer, the UE may wait to communicate with the network entity based on the configuration associated with the selected antenna panel until it may be assumed that the network entity has activated the selected antenna panel and is ready for communications with the UE using the selected antenna panel.

In some aspects, the network entity may indicate, to the UE, configuration information for defining the starting time for determining when to apply the configuration associated with the selected antenna panel. The configuration may be defined for each type of report (e.g., a first configuration may be established for periodic reporting, a second configuration may be established for semi-persistent reporting, and a third configuration may be established for aperiodic reporting). In some aspects, the configuration information for defining the starting time may be established for each report transmitted by the UE to the network entity.

In some aspects, the report may be an aperiodic report for which an acknowledgment message (or negative acknowledgment) may be received. A request to retransmit the report (e.g., a negative acknowledgment, a retransmission request, etc.) may trigger the UE to reset an update timer, as the request to retransmit the report may indicate that the network entity was unable to receive the report and thus that the network entity will not be ready to communicate using the configuration associated with the selected antenna panel prior to expiry of the original (non-reset) update timer. An acknowledgment message need not be transmitted by the network entity (e.g., when the network entity accepts associations between antenna panels and information reported to the network entity, such as a CSI-RS, SSB, or TCI state identifier).

In some aspects, a configuration update may be received from the network entity (e.g., when the network entity rejects associations between antenna panels and information reported to the network entity). The configuration update may include updated associations between, for example, resource identifiers and antenna panels and/or other configuration information that can be used for subsequent communications between the UE and the network entity. The update timer may be activated based on receiving this configuration update, and upon expiry of the update timer, the UE may communicate with the network entity based on the received configuration update.

In some aspects, an acknowledgment message may be received, thus triggering activation of the update timer with a starting time of the time at which the acknowledgment message is received (as discussed above). The acknowledgment message may include, for example, an uplink grant that schedules a transmission using a same HARQ identifier as that associated with the report, a reserved index corresponding to the selected antenna panel carried in a DCI field, or a configuration command received from the network entity in downlink signaling. The configuration command may include, for example, commands associating various resource or state identifiers with a selected antenna panel. The configuration command may include a command to deactivate one or more antenna panels at the UE or may include an antenna panel configuration selected by the network entity which may override the configuration associated with the selected antenna identified in the report.

In some aspects, the starting time and the wait time may correspond to a time at which a TCI state associated with the selected antenna panel is activated.

In some aspects, the starting time and wait time may be based on a subcarrier spacing of one or more component carriers or bandwidth parts associated with one or more of a component carrier on which the report is transmitted, a component carrier on which an acknowledgment of the report is received, or one or more component carriers for which the configuration associated with the selected antenna panel is to be applied. The selected starting and wait times may be associated, for example, with a smallest subcarrier spacing used across the one or more component carriers, so that the starting and wait times are consistent across component carriers. In another example, different starting and wait times may be used for different component carriers or bandwidth parts, when the component carriers or bandwidth parts are associated with different subcarrier spacings.

In some aspects, the component carriers for transmitting reports to the network entity, applying panel configurations, and receiving acknowledgments to the transmitted reports from the network entity may have different subcarrier spacings. In such a case, the total wait time before applying the configuration associated with the selected antenna panel may be defined as a function of the subcarrier spacings for each of these component carriers. For example, the waiting time may be defined according to the equation:

$$ApplicationTime = X + d \times 2^{max(\mu_{applied} - \mu_{report}, 0)} + s \times 2^{max(\mu_{applied} - \mu_{ACK}, 0)}$$

In some aspects, the selected antenna panel and the configuration information associated with the selected antenna panel may be valid based on the timing of resource index reporting. For example, the selected antenna panel may be valid until a next instance at which information associated with the resource index is to be reported.

In some aspects, the UE can receive configuration information identifying a valid amount of time for the selected antenna panel. The UE can communicate with the network entity using the selected antenna panel for a duration corresponding to the valid amount of time after expiry of the update timer.

Example Wireless Communication Devices

Figure 7:
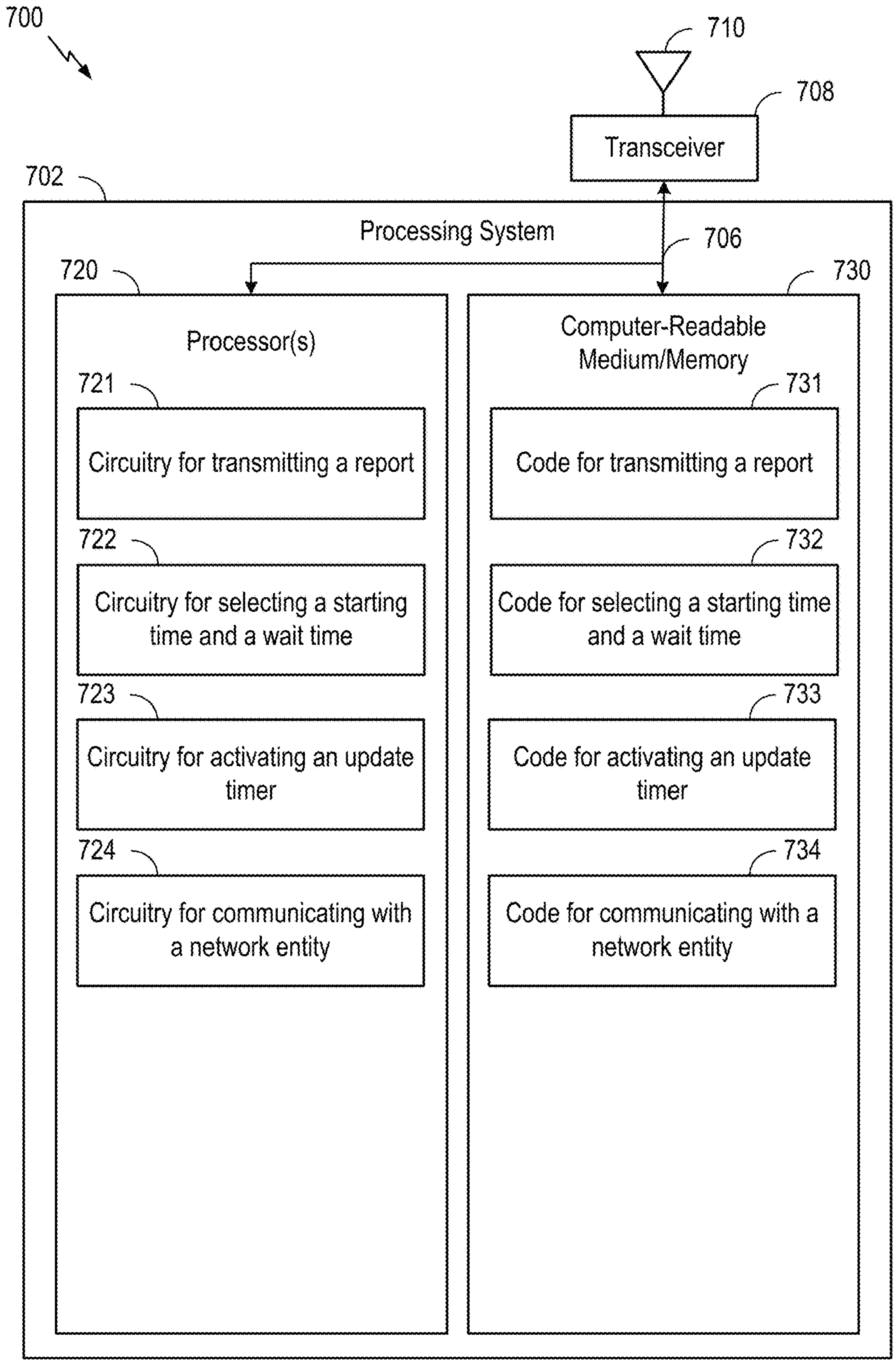
FIG. 7 depicts aspects of an example communications device.

FIG. 7 depicts an example communications device 700 that includes various components operable, configured, or adapted to perform operations for the techniques disclosed herein, such as the operations depicted and described with respect to FIG. 6. In some examples, communication device 700 may be a user equipment 104 as described, for example with respect to FIGS. 1 and 2.

Communications device 700 includes a processing system 702 coupled to a transceiver 708 (e.g., a transmitter and/or a receiver). Transceiver 708 is configured to transmit (or send) and receive signals for the communications device 700 via an antenna 710, such as the various signals as described herein. Processing system 702 may be configured to perform processing functions for communications device 700, including processing signals received and/or to be transmitted by communications device 700.

Processing system 702 includes one or more processors 720 coupled to a computer-readable medium/memory 720 via a bus 706. In certain aspects, computer-readable medium/memory 720 is configured to store instructions (e.g., computer-executable code) that when executed by the one or more processors 720, cause the one or more processors 720 to perform the operations illustrated in FIG. 6, or other operations for performing the various techniques discussed herein to configure the UE to communicate with a network entity using a configuration associated with a selected antenna panel.

In the depicted example, computer-readable medium/memory 730 stores code 731 for transmitting a report, code 732 for selecting a starting time and a wait time, code 733 for activating an update timer, and 734 for communicating with a network entity.

In the depicted example, the one or more processors 720 include circuitry configured to implement the code stored in the computer-readable medium/memory 720, including circuitry 721 for transmitting a report, circuitry 722 for selecting a starting time and a wait time, circuitry 723 for activating an update timer, and circuitry 724 for communicating with a network entity.

Various components of communications device 700 may provide means for performing the methods described herein, including with respect to FIG. 6.

In some examples, means for transmitting or sending (or means for outputting for transmission) may include the transceivers 254 and/or antenna(s) 252 of the user equipment 104 illustrated in FIG. 2 and/or transceiver 708 and antenna 710 of the communication device 700 in FIG. 7.

In some examples, means for receiving (or means for obtaining) may include the transceivers 254 and/or antenna (s) 252 of the user equipment 104 illustrated in FIG. 2 and/or transceiver 708 and antenna 710 of the communication device 700 in FIG. 7.

In some examples, means for generating a sounding reference signal and means for precoding uplink transmissions may include various processing system components, such as: the one or more processors 720 in FIG. 7, or aspects of the user equipment 104 depicted in FIG. 2, including receive processor 258, transmit processor 264, TX MIMO processor 266, and/or controller/processor 280 (including antenna panel configuration component 281).

Notably, FIG. 7 is just use example, and many other examples and configurations of communication device 700 are possible.

Example Clauses

Implementation examples are described in the following numbered clauses:

Clause 1: A method for wireless communications by a user equipment, comprising: transmitting, to a network entity, a report including information associated with an antenna panel selected for communications between the user equipment and the network entity; selecting a starting time and a wait time to apply the information associated with the selected antenna panel; activating an update timer based on the starting time and the wait time; and communicating with the network entity based on a configuration associated with the selected antenna panel after expiry of the update timer.

Clause 2: The method of Clause 1, wherein selecting the starting time comprises selecting a time at which the report including the information associated with the selected antenna panel is transmitted to the network entity.

Clause 3: The method of any one of Clauses 1 or 2, further comprising receiving signaling from the network entity including the starting time.

Clause 4: The method of Clause 3, further comprising transmitting a capability report to the network entity, when the signaling including the starting time is received based on transmitting the capability report to the network entity.

Clause 5: The method of any one of Clauses 1 through 4, wherein the report comprises an aperiodic report.

Clause 6: The method of Clause 5, further comprising: receiving, from the network entity, a request to retransmit the report; and resetting the update timer based on receiving the request to retransmit the report.

Clause 7: 5: The method of any one of Clauses 5 or 6, further comprising: receiving, from the network entity, a configuration update; activating the update timer based on receiving the configuration update; and upon expiry of the update timer, communicating with the network entity based on the received configuration update.

Clause 8: The method of any one of Clauses 1 through 7, further comprising: receiving an acknowledgment message from the network entity in response to transmitting the report, wherein the selected starting time comprises a time at which the acknowledgment message is received.

Clause 9: The method of Clause 8, wherein the acknowledgment message comprises an uplink grant scheduling a transmission using a same hybrid automatic repeat request (HARQ) identifier as a HARQ identifier associated with the report.

Clause 10: The method of Clauses 8 or 9, wherein the acknowledgment message comprises a reserved index carried in a downlink control information (DCI) field, a value of the reserved index corresponding to the selected antenna panel.

Clause 11: The method of Clauses 8 through 10, wherein the acknowledgment message comprises a configuration command received from the network entity in downlink signaling.

Clause 12: The method of Clause 11, wherein the configuration command comprises a command associating one or more of a channel state information (CSI) reference signal (RS) (CSI-RS) identifier, a synchronization signal block (SSB) identifier, or a transmission configuration indicator (TCI) state identifier with the selected antenna panel.

Clause 13: The method of Clause 12, wherein the acknowledgment message comprises a command to deactivate one or more antenna panels at the UE.

Clause 14: The method of any one of Clauses 12 or 13, wherein the acknowledgment message comprises an antenna panel configuration selected by the network entity.

Clause 15: The method of any one of Clauses 12 through 14, wherein the wait time is determined based on whether the selected antenna panel and a panel identified in the antenna panel configuration selected by the network entity are a same antenna panel.

Clause 16: The method of any one of Clauses 1 through 15, wherein: the information associated with the selected panel comprises a transmission control indicator (TCI) state associated with the selected panel; and a sum of the starting time and the wait time corresponds to a time at which the TCI state associated with the selected panel is activated.

Clause 17: The method of any one of Clauses 1 through 16, wherein the starting time and wait time are selected based on a subcarrier spacing of one or more component carriers associated with one or more of a component carrier on which the report is transmitted, a component carrier on which an acknowledgment of the report is received, or one or more component carriers for which the configuration associated with the selected antenna panel is to be applied.

Clause 18: The method of Clause 17, wherein the selected starting time and wait time is associated with a smallest subcarrier spacing used across the one or more component carriers.

Clause 19: The method of Clause 17, wherein different starting time and wait times are associated with different subcarrier spacings of the one or more component carriers.

Clause 20: The method of any one of Clauses 1 through 19, wherein the information associated with an antenna panel selected for communications between the user equipment and the network entity comprises information associated with a resource index, and wherein the selected antenna panel is valid until a next instance at which the information associated with the resource index is reported.

Clause 21: The method of any one of Clauses 1 through 20, further comprising: receiving configuration information identifying a valid amount of time for a selected antenna panel, and wherein communicating with the network entity using the selected antenna panel comprises communicating with the network using the selected antenna panel for the valid of time after expiry of the update timer.

Clause 22: The method of any one of Clauses 1 through 21, wherein the report is associated with a beam reporting instance.

Clause 23: The method of any one of Clauses 1 through 22, wherein the report is associated with a beam failure request message transmitted to the network entity.

Clause 24: A processing system, comprising: a memory comprising computer-executable instructions; and one or more processors configured to execute the computer-executable instructions and cause the processing system to perform a method in accordance with any one of Clauses 1-23.

Clause 25: A processing system, comprising: means for performing a method in accordance with any one of Clauses 1-23.

Clause 26: A non-transitory computer-readable medium comprising computer-executable instructions that, when executed by one or more processors of a processing system, cause the processing system to perform a method in accordance with any one of Clauses 1-23.

Clause 27: A computer program product embodied on a computer-readable storage medium comprising code for performing a method in accordance with any one of Clauses 1-23.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an SI interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHZ spectrum, in millimeter wave (mmWave) frequencies, and/or near mmWave frequencies in communication with the UE 104. When the gNB 180 operates in mmWave or near mm Wave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232*a*-232*t*. Each modulator in transceivers 232*a*-232*t* may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232*a*-232*t* may be transmitted via the antennas 234*a*-234*t*, respectively.

At UE 104, antennas 252*a*-252*r* may receive the downlink signals from the BS 102 and may provide received signals to the demodulators (DEMODs) in transceivers 254*a*-254*r*, respectively. Each demodulator in transceivers 254*a*-254*r* may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254*a*-254*r*, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254*a*-254*r* (e.g., for SC-FDM), and transmitted to BS 102.

At BS 102, the uplink signals from UE 104 may be received by antennas 234*a-t*, processed by the demodulators in transceivers 232*a*-232*t*, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology u=5 has a subcarrier spacing of 480 kHz. The symbol length/duration is inversely related to the subcarrier spacing. FIGS. 3A-3D provide an example of slot configuration 0 with 14 symbols per slot and numerology u=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of sounding and transmission precoding matrix indication determination for uplink transmissions using machine learning models in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communications, the apparatus comprising:

memory having executable instructions stored thereon; and one or more processors configured to, individually or collectively, execute the executable instructions to cause the apparatus to:

transmit, to a network entity, a report including information associated with an antenna panel selected for communications between the apparatus and the network entity, wherein the information associated with the antenna panel includes a maximum number of sounding reference signal (SRS) ports applicable to a plurality of component carriers (CCs);

receive an acknowledgment message from the network entity in response to transmitting the report, wherein the acknowledgment message comprises an antenna panel configuration selected by the network entity and an uplink grant scheduling a transmission using a same hybrid automatic repeat request (HARQ) identifier as a HARQ identifier associated with the report; and apply the information associated with the selected antenna panel for communicating with the network entity.

2. The apparatus of claim 1, wherein the one or more processors are configured to, individually or collectively, execute the executable instructions to cause the apparatus to apply the information in multiple of the plurality of CCs.

3. The apparatus of claim 1, wherein different subcarrier spacing (SCS) are configured for at least two of the plurality of CCs.

4. The apparatus of claim 1, wherein the one or more processors are configured to, individually or collectively, execute the executable instructions to cause the apparatus to apply the information in each of the plurality of CCs at a same time instance.

5. The apparatus of claim 4, wherein the time instance is associated with a smallest subcarrier spacing (SCS) among a plurality of SCSs configured for the plurality of CCs.

6. The apparatus of claim 1, wherein the one or more processors are configured to, individually or collectively, execute the executable instructions to cause the apparatus to separately determine a plurality of respective time instance to apply the information in each respective CC of the plurality of CCs.

7. The apparatus of claim 1, wherein the one or more processors are configured to, individually or collectively, execute the executable instructions to cause the apparatus to:

transmit the report on a first CC;

apply the information associated with the selected antenna panel on at least a second CC;

receive, on a third CC, the acknowledgment message from the network entity; and determine at least one time instance to apply the information associated with the selected antenna panel based on a function of at least a first subcarrier spacing (SCS) configured for the first CC, a second SCS configured for the second CC, and a third SCS configured for the third CC.

8. The apparatus of claim 1, wherein the one or more processors are configured to, individually or collectively, execute the executable instructions to cause the apparatus to:

determine a starting time and a wait time for the applying the information associated with the selected antenna panel;

activate an update timer based on the starting time and the wait time; and apply the information associated with the selected antenna panel in response to expiry of the update timer.

9. The apparatus of claim 8, wherein the starting time comprises a time at which the acknowledgment message from the network entity is received.

10. The apparatus of claim 8, wherein the one or more processors are configured to, individually or collectively, execute the executable instructions to cause the apparatus to determine the wait time based on the selected antenna panel and a panel identified in an antenna panel configuration.

11. The apparatus of claim 8, wherein the starting time comprises a time of the transmitting the report including the information associated with the selected antenna panel to the network entity.

12. The apparatus of claim 8, wherein the one or more processors are configured to, individually or collectively, execute the executable instructions to cause the apparatus to receive signaling from the network entity including the starting time.

13. The apparatus of claim 12, wherein the one or more processors are configured to, individually or collectively, execute the executable instructions to cause the apparatus to transmit a capability report to the network entity, wherein the signaling including the starting time is received in response to the capability report.

14. The apparatus of claim 8, wherein the one or more processors are configured to, individually or collectively, execute the executable instructions to cause the apparatus to:

receive, from the network entity, a request to retransmit the report; and reset the update timer in response to receiving the request to retransmit the report, wherein the report comprises an aperiodic report.

15. The apparatus of claim 8, wherein the one or more processors are configured to, individually or collectively, execute the executable instructions to cause the apparatus to determine the wait time based on whether the selected antenna panel and a panel identified in an antenna panel configuration selected by the network entity are a same antenna panel.

16. The apparatus of claim 1, wherein the acknowledgment message comprises a reserved index carried in a downlink control information (DCI) field, a value of the reserved index corresponding to the selected antenna panel.

17. The apparatus of claim 1, wherein the acknowledgment message comprises a configuration command.

18. The apparatus of claim 17, wherein the configuration command comprises a command associating one or more of a channel state information (CSI) reference signal (RS) (CSI-RS) identifier, a synchronization signal block (SSB) identifier, or a transmission configuration indicator (TCI) state identifier with the selected antenna panel.

19. The apparatus of claim 1, wherein the acknowledgment message comprises a command to deactivate one or more specified antenna panels at the UE.

20. The apparatus of claim 1, wherein the information associated with the antenna panel comprises information associated with a resource index, and wherein the selected antenna panel is valid until a next instance at which the information associated with the resource index is reported.

21. The apparatus of claim 1, wherein the report is associated with one of a beam reporting instance or a beam failure request message transmitted to the network entity.

22. A method for wireless communications by a user equipment, the method comprising:

transmitting, to a network entity, a report including information associated with an antenna panel selected for communications between the user equipment and the network entity, wherein the information associated with the antenna panel includes a maximum number of sounding reference signal (SRS) ports applicable to a plurality of component carriers (CCs);

receiving an acknowledgment message from the network entity in response to transmitting the report, wherein the acknowledgment message comprises an antenna panel configuration selected by the network entity and an uplink grant scheduling a transmission using a same hybrid automatic repeat request (HARQ) identifier as a HARQ identifier associated with the report; and applying the information associated with the selected antenna panel for communicating with the network entity.

23. The method of claim 22, wherein the applying the information associated with the selected antenna panel comprises applying the information in multiple of the plurality of CCs.

24. The method of claim 22, wherein different subcarrier spacing (SCS) is configured for at least two of the plurality of CCs.

25. The method of claim 22, wherein the applying the information associated with the selected antenna panel comprises applying the information in each of the plurality of CCs at a same time instance.

26. The method of claim 25, wherein the time instance is associated with a smallest subcarrier spacing (SCS) among a plurality of SCSs configured for the plurality of CCs.

27. The method of claim 22, wherein the applying the information associated with the selected antenna panel comprises separately determining a plurality of respective time instance to apply the information in each respective CC of the plurality of CCs.

28. An apparatus for wireless communications, the apparatus comprising:

means for transmitting, to a network entity, a report including information associated with an antenna panel selected for communications between the apparatus and the network entity, wherein the information associated with the antenna panel includes a maximum number of sounding reference signal (SRS) ports applicable to a plurality of component carriers (CCs);

means for receiving an acknowledgment message from the network entity in response to transmitting the report, wherein the acknowledgment message comprises an antenna panel configuration selected by the network entity and an uplink grant scheduling a transmission using a same hybrid automatic repeat request (HARQ) identifier as a HARQ identifier associated with the report; and means for applying the information associated with the selected antenna panel for communicating with the network entity.

29. A non-transitory computer-readable medium having instructions stored thereon which, when executed by a processor, causes a user equipment to perform a method for wireless communications, the method comprising:

transmitting, to a network entity, a report including information associated with an antenna panel selected for communications between the user equipment and the network entity, wherein the information associated with the antenna panel includes a maximum number of sounding reference signal (SRS) ports applicable to a plurality of component carriers (CCs);

receiving an acknowledgment message from the network entity in response to transmitting the report, wherein the acknowledgment message comprises an antenna panel configuration selected by the network entity and an uplink grant scheduling a transmission using a same hybrid automatic repeat request (HARQ) identifier as a HARQ identifier associated with the report; and applying the information associated with the selected antenna panel for communicating with the network entity.

* * * * *